D. H. Whittemore,
Bit Stock.
N°. 20,010.   Patented Apr. 20, 1858.
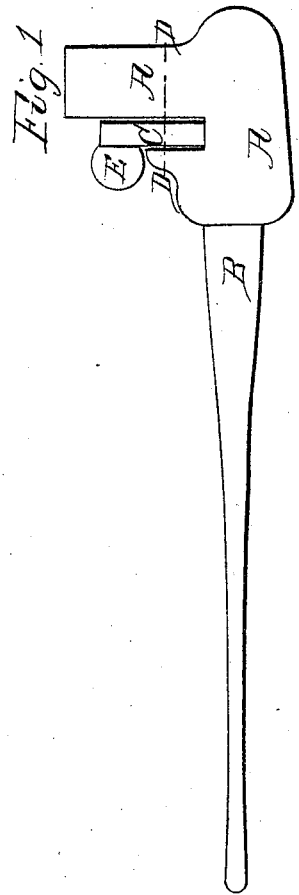
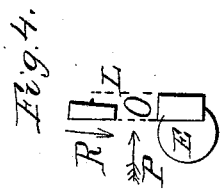
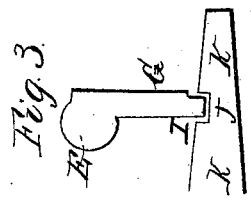
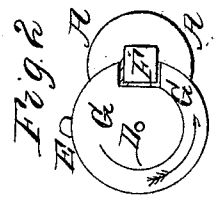

UNITED STATES PATENT OFFICE.

DAVID H. WHITTEMORE, OF WORCESTER, MASSACHUSETTS.

BIT-HOLDER.

Specification of Letters Patent No. 20,010, dated April 20, 1858.

*To all whom it may concern:*

Be it known that I, DAVID H. WHITTEMORE, of Worcester, in the county of Worcester and State of Massachusetts, have invented a new and Improved Mode of Holding Boring and other Tools in Their Sockets as Applied to Braces, &c.; and I do hereby declare that the following is a full, clear, and exact description of the same, reference being had to the annexed drawings and making part of this specification, in which—

Figure 1 is the shank of a brace with a tool inserted and held by the improved holder. Fig. 2 is a sectional cross view of the brace where the tool is inserted showing the socket for the same and also a back view of the holder. Fig. 3 represents the holder and the position of a bit being held by it. Fig. 4 is an edge view of the holder showing the cam hereinafter described.

In Fig. 1 A, A, is the body of the shank of the brace, it being cut off from the same at M. B, B, is a common boring tool inserted in the brace A, A. C, D, is the holder, having been turned about one quarter of the way around upon its center after the tool B, B, has been inserted holding it firm in its socket. The port E of the holder is a thumb-piece to turn the holder by, but a bur upon the edge of the same may be substituted.

In Fig. 2, C is a back side view of the holder which is made to turn upon its center D, and upon one edge is made a slot F to correspond in shape and is about one-half the size of the socket in the brace and is so made for the insertion of the bit, after which the holder C is turned in the direction of the arrow. The part or cam G passes through a slot in the shank of the bit and prevents it from pulling out of its socket and if said slot in the bit is made too near the end the bit will be loose, but the cam G when the holder is turned draws the bit back firm and tight in its socket. A, A, in Fig. 2 is a cross sectional view of the brace showing the socket for the bit and its relative position with the holder just described.

In Fig. 3 is seen an edge view of the holder C, E, and the cam I upon the edge of the same showing its connection with the shank k, k, of a bit, the part I of the holder passing into the slot J of said shank touching the same at the point as seen.

In Fig. 4 is an edge view of the holder (the opposite of that seen in Figs. 1 and 3) showing the slot O, for the entrance of the shank of a bit in the direction of the arrow P and also showing the cam upon the holder commencing at the point L and ending at M, the edge presented being made to move in the direction of the arrow R. To place in and remove a tool from the socket of this brace place the holder in position as shown in Fig. 2, then insert the bit and turn the holder in the direction of the arrows before described until the cam draws tight upon the shank of the bit in the slot, which is not more than one half of the way around upon its center, and to remove the bit simply reverse the process.

The advantages of this mode of holding bits are obvious. First, there is but one part except the pin which holds it, thereby dispensing with the spring usually necessary and making it simple; second, from the firm and substantial manner in which it holds the bit, and thirdly from the ease and despatch with which it can be operated.

Having thus described my improvement what I claim as my invention and desire to secure by Letters Patent is—

The holder C, E, with its cam when applied in the manner and for the purpose set forth.

DAVID H. WHITTEMORE.

Witnesses:
HENRY CHAPIN,
G. A. WILLIAMS.